No. 862,099. PATENTED JULY 30, 1907.
A. L. OLSON.
DEVICE FOR AUTOMATICALLY DISCONNECTING POWER DRIVEN PUMPS.
APPLICATION FILED MAY 29, 1906.
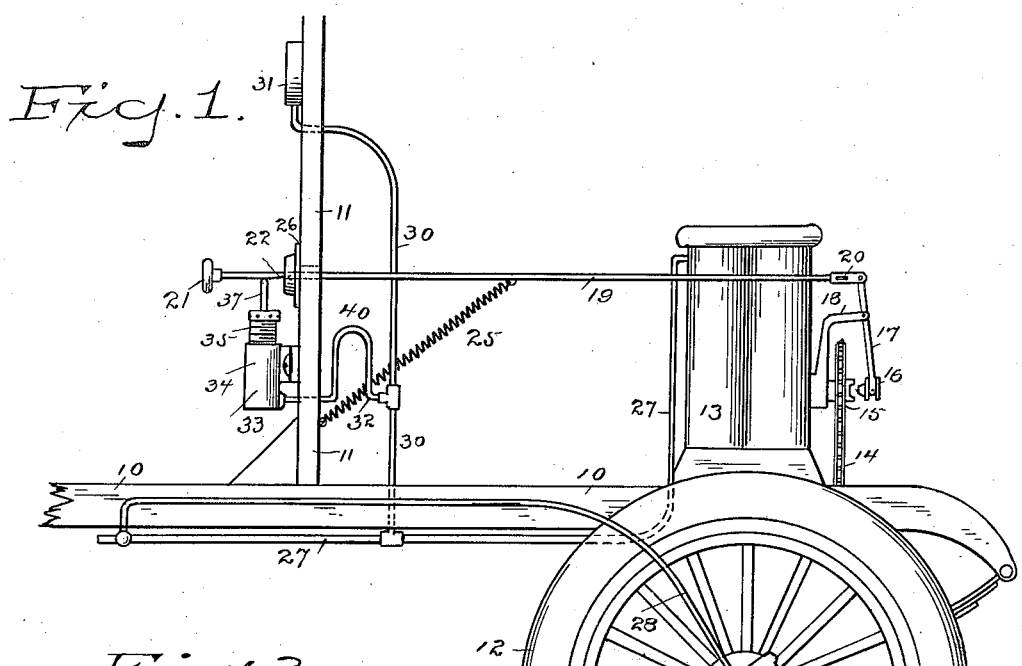
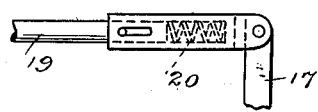
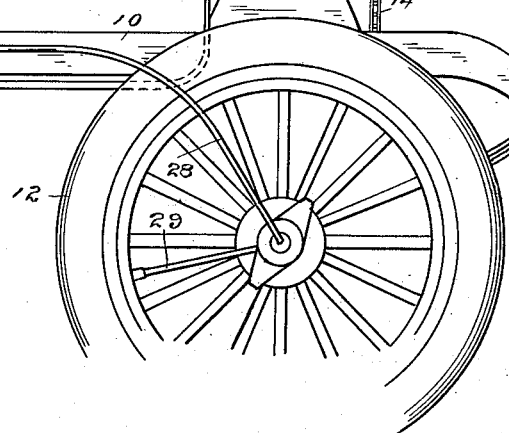
WITNESSES
H. A. Lamb.
S. W. Atherton.
INVENTOR
Axel L. Olson
BY
A. M. Wooster
ATTORNEY

UNITED STATES PATENT OFFICE.

AXEL L. OLSON, OF ESSEX, CONNECTICUT.

DEVICE FOR AUTOMATICALLY DISCONNECTING POWER-DRIVEN PUMPS.

No. 862,099.　　　Specification of Letters Patent.　　　Patented July 30, 1907.

Application filed May 29, 1906. Serial No. 319,307.

*To all whom it may concern:*

Be it known that I, AXEL L. OLSON, a citizen of the United States, residing at Essex, county of Middlesex, State of Connecticut, have invented a new and useful Device for Automatically Disconnecting Power-Driven Pumps, of which the following is a specification.

This invention is applicable to power-driven air pumps generally and is especially adapted for use upon automobiles provided with power pumps for inflating the tires, and the invention has for its object to provide a device that will automatically disconnect the pump from the power when the pressure in a tire shall have reached a predetermined height, as indicated by a pressure gage.

With this and other objects in view I have devised the novel disconnecting device of which the following description in connection with the accompanying drawing is a specification, reference characters being used to indicate the several parts:

Figure 1 is an elevation of so much of an automobile as is necessary to illustrate the application thereto of a power driven air pump and my novel disconnecting device; Fig. 2 a detail view on an enlarged scale, partly in elevation and partly in section, illustrating my novel disconnecting device detached; and Fig. 3 is a detail view illustrating the connection of the shipper rod to the operating lever.

10 denotes the frame of an automobile, 11 the dashboard, 12 a wheel and 13 a power-driven air pump rigidly secured to the frame. The pump may be operated in any suitable manner as by means of a sprocket chain 14 extending from a driving sprocket, not shown, which runs with the car standing or in motion, and passing over a sprocket wheel 15 on the shaft of the pump. Wheel 15 normally runs loose on the pump shaft, not shown, and is connected thereto by means of a suitable clutch 16, one member of which is shown in the present instance as carried by an operating lever 17 pivoted on a bracket 18 extending from the pump. The clutch is not illustrated in detail for the reason that specifically it forms no portion of my present invention and any ordinary or preferred form of clutch may be used.

19 denotes the shipper rod which is connected to the operating lever, preferably by means of a spring connection 20, as indicated in Fig. 3. This shipper rod extends rearwardly and passes through the dashboard, being provided at its inner end with a knob 21 to adapt it to be operated by the foot of the operator in starting the pump. The shipper rod is provided in its underside with a notch which inclines rearwardly from a straight shoulder 22, said shoulder being adapted to engage a projection 23 in an opening 24 in a plate 26 upon the dashboard through which said rod passes.

25 denotes a spring connected to the shipper rod and to the dashboard, the action of which is to draw the shipper rod backward when the shoulder is disengaged from the projection, disconnect the clutch members and stop the operation of the pump, as indicated in Fig. 1.

27 denotes an air pipe leading from the pump, 28 a pipe leading from pipe 27 to the hub of the wheel, 29 a pipe leading from the hub to the tire, 30 a pipe leading from pipe 27 to a pressure gage 31 on the dashboard, and 32 an air inlet pipe leading from pipe 30 to my novel disconnecting device, which as a whole I have indicated by 33. It should be understood that these pipes are merely enumerated specifically in order to illustrate the operation of my novel disconnecting device, the special arrangement of the pipes and the manner in which air is conveyed to the tire being wholly unimportant so far as the present invention is concerned.

My novel connecting device comprises a cylindrical air receiver 34 closed at the top by means of an adjustable screw plug 35. Within the receiver is a piston 36 whose rod 37 extends through the screw cap. A spring 38 bearing against the piston and the inner end of the screw plug normally acts to retain the piston at its forward or inoperative position. The lower end of the piston rod is extended beyond the piston and is adapted to engage the inner end of the body and prevent the movement of the piston past the air inlet pipe. The upper end of the piston rod lies below the shipper rod and in alinement therewith. Air inlet pipe 32 leads into the lower end of the receiver below the piston and is preferably provided with a trap 40 to prevent the possibility of oil passing from the receiver to the main air pipe 27.

To set the disconnecting device, the pump is started and the pressure in the tire raised to the desired height, as indicated by the gage. The operator then turns the screw plug up or down, as may be required, until the piston rod is at just the required height to disengage the shipper rod from plate 26 at the pressure indicated by the gage. Having set the disconnecting device to disengage the shipper rod at any desired tire pressure, for example from eighty to ninety pounds as indicated by the gage, the operation of the disconnecting device will in future be entirely automatic. As soon as pump pressure is applied in inflating a tire, it is obvious that the pressure at the gage, in the tire and in the receiver of the disconnecting device will be the same. The air pressure against the piston will raise the latter against the power of spring 38 and with it the piston rod which will engage the shipper rod, lift the latter as the pressure increases and when the pressure shall have reached the predetermined height will disengage the shoulder on the shipper rod from the projection and spring 25 will instantly draw the shipper rod backward, as in Fig. 1, disconnect the clutch and stop the operation of the pump. To start the pump at any time, the operator places his foot against the knob, presses the shipper rod forward and connects the shoulder with the projection on plate 26. This throws the clutch members into engagement and starts the pump to operating again. To set the disconnecting device to operate at a higher pressure, the screw plug is turned inward thereby increasing the tension of spring 38, and to cause the disconnecting device to operate at a lower pressure the screw plug is turned outward, thus relieving the tension of the spring. Should it be required at any time to disconnect the pump without waiting for the disconnecting device to act or should the latter not operate quickly enough, the pump may be disconnected by simply lifting the shipper rod by the foot or hand and allowing spring 25 to draw it backward as soon as the shoulder is disengaged from the projection.

Having thus described my invention I claim:

1. The combination with a vehicle having a tire to be inflated, of a pump supported by the frame of the vehicle, said pump being independent of the wheels of the vehicle, an air conduit for supplying the tire with air from said pump, means including a rod for controlling the power operation of the pump, an air receiver connected with the air conduit, a piston in said receiver, and means whereby variations in the position of the piston due to the air pressure will shift the position of said rod.

2. The combination with a vehicle having a tire to be inflated, of a pump supported by the frame of the vehicle, said pump being independent of the wheels of the vehicle, an air conduit for supplying the tire with air from said pump, means including a rod for controlling the power operation of the pump, an air receiver connected with the air conduit, a spring-controlled piston in said receiver, and a rod extending from said piston and adapted to engage the pump controlling rod.

3. The combination with a vehicle having a tire to be inflated, of a pump supported by the frame of the vehicle, said pump being independent of the wheels of the vehicle, an air conduit for supplying the tire with air from said pump, means including a rod for controlling the power operation of the pump, an air receiver connected with the air conduit, an adjustable screw plug closing one end of the receiver, a piston in said receiver, a spring acting against the piston to force it in one direction, and a rod extending from said piston and passing through the screw plug and adapted to engage the pump controlling rod to shift it laterally out of engagement with its catch.

4. The combination with a vehicle having a tire to be inflated, of a pump supported by the frame of the vehicle, said pump being independent of the wheels of the vehicle, an air conduit for supplying the tire with air from said pump, means including a rod for controlling the power operation of the pump, a spring connected with said rod to move it in one direction, a catch for restricting the movement of said rod under the influence of its spring, an air receiver connected with the air conduit, an adjustable screw plug closing one end of the receiver, a piston in said receiver, a spring acting against the piston to force it in one direction, and a rod extending from said piston and passing through the screw plug and adapted to engage the pump controlling rod to shift it laterally out of engagement with its catch.

5. The combination with a vehicle having a tire to be inflated, of a pump supported by the frame of the vehicle, said pump being independent of the wheels of the vehicle, an air conduit for supplying the tire with air from said pump, a clutch for connecting and disconnecting power operated mechanism from the pump, a longitudinally-movable and laterally-shiftable shipper rod by which the clutch is operated and which is provided with a notch, a plate through which the shipper rod passes and which is provided with a detent to engage the notch and a spring for drawing the shipper rod backward and disconnecting the clutch when the notch is disengaged, of a disconnecting device comprising an air receiver, a piston in said receiver, a rod extending therefrom and adapted to engage the shipper rod to shift it laterally out of engagement with said detent and an air pipe leading from the pump to the receiver, whereby the piston and piston rod are raised and the shipper rod disengaged to stop the pump when the air pressure has reached a predetermined height.

6. The combination with a vehicle having a tire to be inflated, of a pump supported by the frame of the vehicle, said pump being independent of the wheels of the vehicle, an air conduit for supplying the tire with air from said pump, a clutch for connecting and disconnecting power operated mechanism from the pump, a longitudinally-movable and laterally-shiftable shipper rod by which the clutch is operated, a detent for retaining the shipper rod in position to retain the clutch members in engagement, and a spring for drawing the shipper rod backward and disengaging the clutch members, of a disconnecting device comprising an air receiver, a piston in said receiver, a rod extending therefrom and adapted to engage the shipper rod to shift it laterally out of engagement with said detent and an air pipe leading from the pump to the receiver.

7. The combination with a vehicle having a tire to be inflated, of a pump supported by the frame of the vehicle, said pump being independent of the wheels of the vehicle, an air conduit for supplying the tire with air from said pump, a clutch for connecting and disconnecting power operated mechanism from the pump, a longitudinally-movable and laterally-shiftable shipper rod by which the clutch is operated, a detent for retaining the shipper rod in position to retain the clutch members in engagement, and a spring for drawing the shipper rod backward and disengaging the clutch members, of a disconnecting device comprising an air receiver, an adjustable screw plug which closes one end of said receiver, a piston in the receiver, a spring acting to force the piston forward, a rod extending from the piston and passing through the screw plug and adapted to engage the shipper rod to shift it laterally out of engagement with said detent and an air pipe leading from the pump to the receiver.

In testimony whereof I affix my signature, in presence of two witnesses.

AXEL L. OLSON.

Witnesses:
 JONAS W. DOLPH,
 S. B. TILEY.